(12) United States Patent
Yamamoto (10) Patent No.: US 7,213,871 B2
(45) Date of Patent: May 8, 2007

(54) ROPS CANOPY OF HYDRAULIC SHOVEL

(75) Inventor: Hiroshi Yamamoto, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/547,188

(22) PCT Filed: Feb. 27, 2004

(86) PCT No.: PCT/JP2004/002357

§ 371 (c)(1),
(2), (4) Date: Aug. 25, 2005

(87) PCT Pub. No.: WO2004/076264

PCT Pub. Date: Sep. 10, 2004

(65) Prior Publication Data

US 2006/0186703 A1    Aug. 24, 2006

(30) Foreign Application Priority Data

Feb. 27, 2003   (JP) .............................. 2003-051911

(51) Int. Cl.
*B62D 25/06* (2006.01)
(52) U.S. Cl. .............................................. 296/190.03
(58) Field of Classification Search ........... 296/190.03, 296/190.01
See application file for complete search history.

(56) References Cited

U.S. PATENT DOCUMENTS

| 5,529,342 | A | | 6/1996 | Mast et al. |
| 5,586,784 | A | | 12/1996 | Mast et al. |
| 6,149,228 | A | * | 11/2000 | O'Neill et al. ......... 296/190.03 |
| 6,419,304 | B1 | * | 7/2002 | Richardson et al. ... 296/190.03 |
| 2002/0153748 | A1 | | 10/2002 | Sakyo et al. |

FOREIGN PATENT DOCUMENTS

| JP | 54-78122 | 6/1979 |
| JP | 2000-064354 A | 2/2000 |
| JP | 2000-308639 A | 11/2000 |
| JP | 2002-097669 A | 4/2002 |

* cited by examiner

*Primary Examiner*—H Gutman
(74) *Attorney, Agent, or Firm*—Frishauf, Holtz, Goodman & Chick, P.C.

(57) ABSTRACT

A ROPS canopy of a hydraulic shovel (hydraulic excavator) is commonly usable among various models regarding different automobile ranks. To configure this, a ROPS canopy (50A) in which two columns (31, 32) support a roof structure (40) is predefined as a basic type ROPS canopy, and the basic type ROPS canopy (50A) is so configured that at least an additional column (51, 52, 53, 54, 55, 56) can be attached such that the basic type ROPS canopy (50A) can be adapted to a ROPS canopy of higher class model. The additional columns (51, 52, 53, 54, 55, 56) are installable (57, 58*b*) by merely an add-on method.

4 Claims, 12 Drawing Sheets

ROPS CANOPY OF HYDRAULIC SHOVEL

This application is a U.S. National Phase Application under 35 USC 371 of International Application PCT/JP2004/002357 filed Feb. 27, 2004.

TECHNICAL FIELD

The present invention relates to a ROPS canopy of a hydraulic shovel (hydraulic excavator).

BACKGROUND ART

A compact hydraulic excavator generally used for civil engineering work in a city tends to be emphasized on its mobility when traveling between working sites since the operation period of the hydraulic excavator per working site is short, and therefore, a simply structured canopy being lightweight and having easily attachable/detachable two columns is mostly installed for protecting an operator's cab. However, in recent years, there are demand on enhancing the safeness for satisfying the unified strength standard, for instance the ROPS (Rollover Protective Structure) which is a strength standard prescribed in the ISO standard etc., even for the specification of canopies for assuring the safety of an operator in case of rollover accident of a vehicle.

DISCLOSURE OF THE INVENTION

In such case, since the ROPS canopy requires the strength enduring the rollover of the vehicle as stated in the name of "ROPS", the strength of a canopy body as well as a member for supporting the canopy body is necessary. As the way satisfying this demand, for instance, there is Japanese Patent Application No. 2002-308639 (see pages 7 to 8, FIGS. 1 to 2), which is filed by the assignee of the present application but not yet open to the public.

An example of the ROPS canopy described in the above-mentioned Japanese Patent Application will be described below with reference to FIGS. 11 and 12. A hydraulic excavator 60 balances with a load applied to a working equipment 69 attached on a front end portion of a revolving frame 65 by a counterweight 61 attached on a rear end portion of the revolving frame 65. The counterweight 61 is formed by casting with an outer surface being molded in a substantially arcuate profile, extended portions 71, 72 extending horizontally being formed at a lower portion thereof in a substantially arcuate profile, and a projection 73 being formed at the center of the lower portion thereof. Lower attaching seats 71a, 72a, 73a respectively formed on lower surfaces of the extended portions 71, 72 and the projection 73 are attached on an upper surface of the rear end portion of the revolving frame 65 with screw bolts 74, 75, 76.

A lower attaching bracket 83 formed by casting of a ROPS canopy 62 is placed on the upper surface of the counterweight 61 and attached by inserting a plurality of screw bolts 88 to a plurality of bolt holes (not shown) formed in the upper surface of the counterweight 61 and bolt holes 83A of the bracket 83 and then by fastening with nuts (not shown). And, opposed columns 81a, 81b for supporting a roof 82 are inserted to opposed column attachment 84a, 84b of the lower attaching bracket 83 and fixed.

Figure 12:
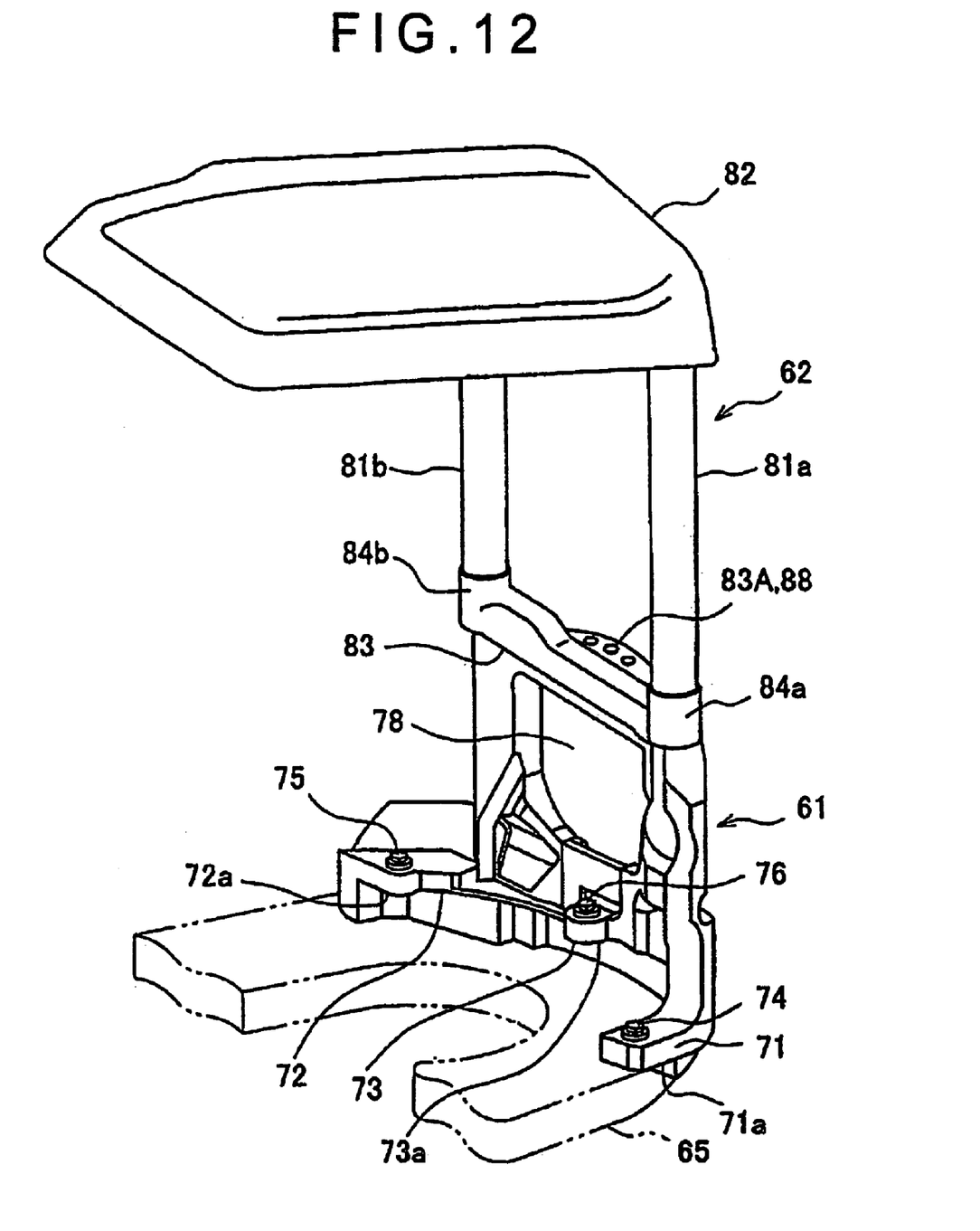
FIG. 12 is a perspective view showing the configuration of the ROPS canopy of FIG. 11.

Further, as shown in FIG. 12, an inspection hole 78 is formed at a center portion of the counterweight 61. Accordingly, an engine (not shown) arranged in the vicinity of a front portion of the counterweight 61 can easily be inspected and maintained.

Figure 11:
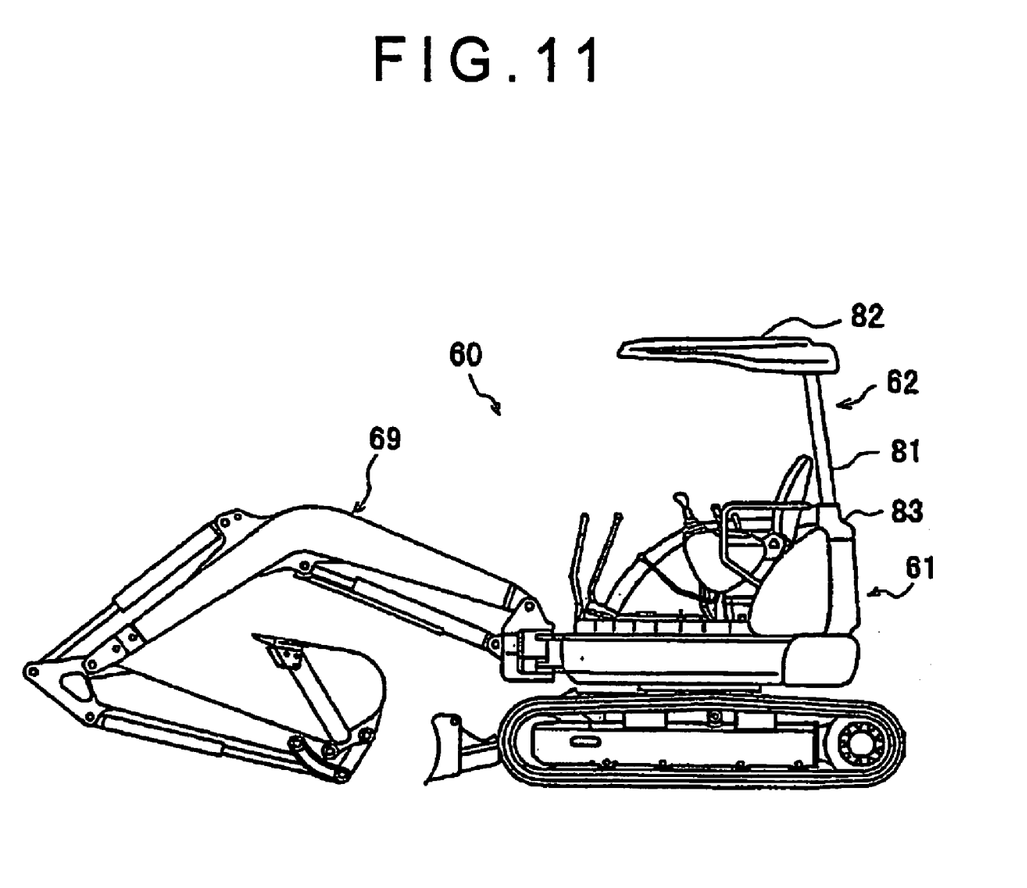
FIG. 11 is a side elevation showing a hydraulic excavator applying a ROPS canopy in the midterm stage heading to the present invention.

With the configuration shown in FIGS. 11 to 12, the ROPS canopy 62 is tightly placed on the upper surface of the counterweight 61 attached on the revolving frame 65, the columns 81a, 81b of the ROPS canopy 62 use straight and large-diameter pipes, the lower attaching bracket 83 is formed by casting, and the opposed column attachments 84a, 84b have smooth surfaces, so that the stress concentration is reduced, thus sufficiently securing a predetermined strength for the ROPS canopy 62.

However, according to the ROPS canopy of the above Japanese Patent Application, the ROPS canopy 62 must have the strength not to be damaged due to its vehicle weight if the vehicle is rolled over, causing following problems.

The load applied to the ROPS canopy if the vehicle is rolled over is approximately proportional to the vehicle weight. Owing to this, even if a common operator's cab is provided among various models of hydraulic excavators with different specification ranks (hereinafter, referred to as automobile ranks), the ROPS canopy has to match the predetermined strength corresponding to the vehicle weight of each model. Accordingly, a specific ROPS canopy must be prepared for each model. However, since the ROPS canopy is installed at a user's option, stocks are required respectively for the ROPS canopies with specifications being different according to the models, thus increasing the total stock amount of the ROPS canopy as well as the stock control cost. Further, in order to keep the appropriate stock amount for each model of the ROPS canopies, a production unit number (hereinafter, referred to as a lot size) for each model of the ROPS canopies becomes extremely small, thereby raising the production cost.

The present invention is directed to overcome the problems as set forth above, and an object of the present invention is to provide a ROPS canopy of a hydraulic excavator commonly usable among various models of hydraulic excavators with different automobile ranks.

In order to achieve the above-described object, in a first configuration, concerning a ROPS canopy of a hydraulic excavator, the ROPS canopy in which two columns support a roof structure is predefined as a basic type ROPS canopy, and the basic type ROPS canopy is configured so that at least a column can additionally be attached to be adapted to a ROPS canopy of higher class model.

With the first configuration, following advantages can be attained. The basic type ROPS canopy can be applied to a hydraulic excavator of lower class model regarding the automobile ranks, while the ROPS canopy in which a predetermined number of columns are additionally attached to the basic type ROPS canopy so as to enhance the strength can be applied to a hydraulic excavator of higher class model regarding the automobile ranks. Accordingly, since the basic type ROPS canopy is sharable among the various models of the hydraulic excavators regarding the different automobile ranks, the stocks can be shared by the various models of the hydraulic excavators regarding the different automobile ranks, so that the stock control cost can significantly be reduced as well as the production lot size of the basic type ROPS canopy can be increased, thus remarkably reducing the production cost. Additionally, since the additional columns can freely be set according to each of the various models, and the additional columns also can be standardized to preset the number of additional columns according to each of the various models, the stock control cost and the production cost can further be reduced.

In a second configuration, concerning the first configuration, the additional columns can be attached by merely an add-on method. With the second configuration, following advantages can be attained in addition to that of the first configuration. Since the additional columns can easily be attached/detached, the specifications can be modified to the canopy for higher class model from the basic type ROPS canopy and vice versa easily and quickly in an attachment site. Additionally, the hydraulic excavator can save the operation time. Further, the strength of the ROPS canopy with the additional columns being attached as well as the basic type ROPS canopy can be assured as the one checked in a manufacturer in advance even in the attachment site of the ROPS canopy.

BEST MODE FOR CARRYING OUT THE INVENTION

Embodiments of a ROPS canopy of a hydraulic excavator according to the present invention will be described below with reference to FIGS. 1 to 10.

Figure 1:
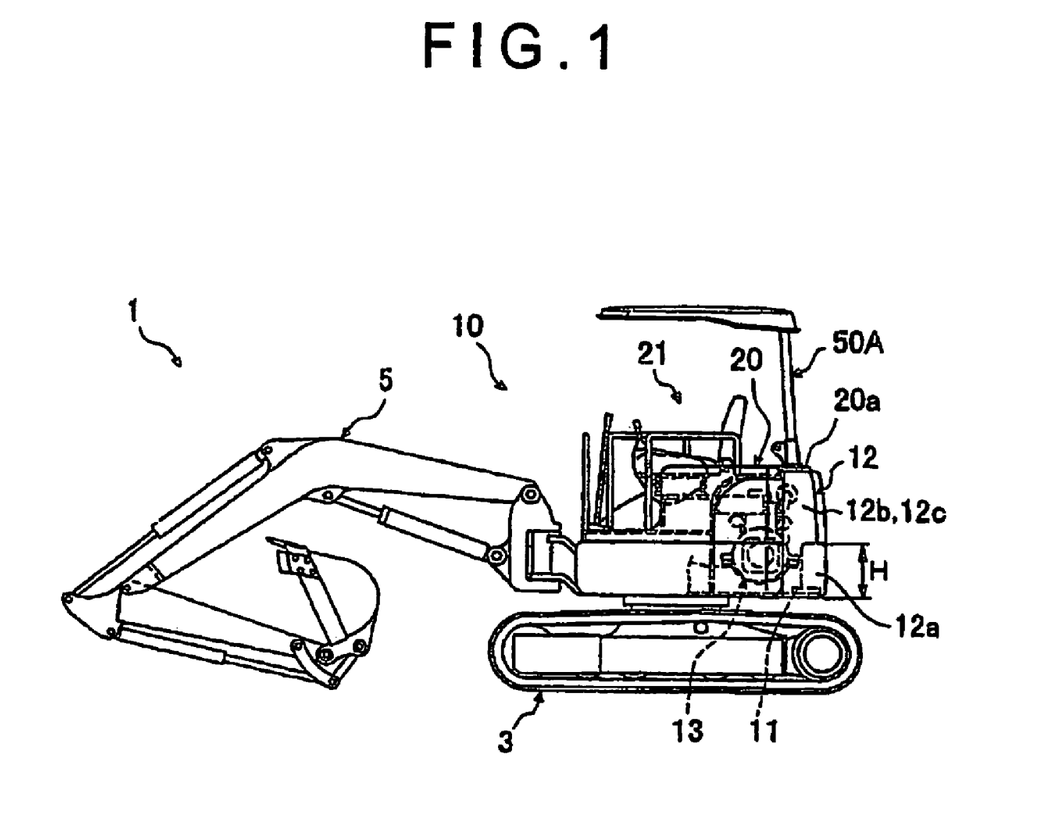
FIG. 1 is a side elevation showing a hydraulic excavator applying a ROPS canopy according to a first embodiment of the present invention.
Figure 2:
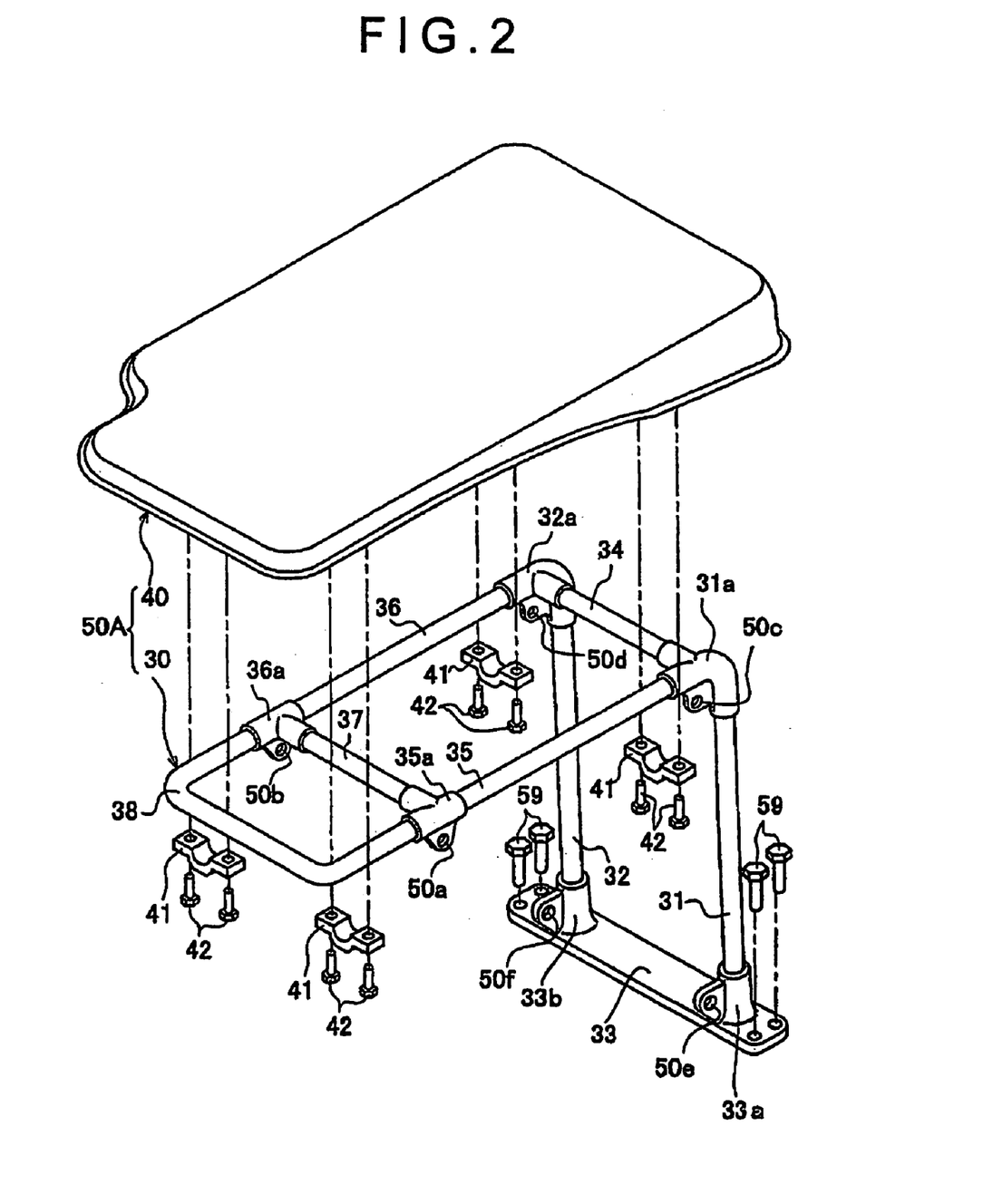
FIG. 2 is a perspective view showing the configuration of the ROPS canopy of the first embodiment.

Now, a first embodiment will be described with reference to FIGS. 1 and 2. FIG. 1 is a side elevation showing a hydraulic: excavator applying a ROPS canopy according to the first embodiment, and FIG. 2 is a perspective view showing the configuration of the ROPS canopy according to the first embodiment. Note that, components substantially having the same functions as that shown in the above-mentioned drawings will be assigned with the same numeric references, and the description thereof will be omitted in this and later embodiments.

In FIGS. 1 and 2, a hydraulic excavator 1 is configured that an upper revolving body 10 is revolvably mounted on an upper portion of a base carrier 3, the upper revolving body 10 having a revolving frame 11 at a bottom portion thereof, and a working equipment 5 being attached on a front end portion of the revolving frame 11. In a rear portion of the revolving frame 11, a counterweight 12 is arranged in a rear end portion for balancing with the working equipment 5, and an engine 13 is arranged in the vicinity of a front portion of the counterweight 12. The counterweight 12 consists of a center base portion 12a with a predetermined height H, and supporting portions 12b, 12c vertically arranged anglewise on left and right portions of the center base portion 12a. The height H of the center base portion 12a is restricted by adapting the opposed supporting portions 12b, 12c as an additional counterweight. Additionally, a flange 20a provided on a rear portion of a floor frame 20 in which an operator's cab 21 is arranged is fastened on upper surfaces of the opposed supporting portions 12b, 12c of the counterweight 12 with a certain number of screw bolts (details will be described later with reference to FIG. 4 of a second embodiment), and a ROPS canopy 50A is fastened on an upper surface of the flange 20a with a certain number of screw bolts 59.

The ROPS canopy 50A is so configured that a roof structure 40 is attached on a column structure 30 with a certain number of clamps 41 as well as screw bolts 42. The column structure 30 has a base member 33 at a bottom portion thereof, opposed columns 31, 32 being vertically arranged in a manner that lower end portions of the opposed columns 31, 32 are inserted and fixed to attaching members 33a, 33b located on left and right portions of an upper surface of the base member 33. Opposed connecting members 31a, 32a are respectively fit to upper end portions of the opposed columns 31, 32 and fixed, and besides a cross pipe 34 is inserted between the opposed connecting members 31a, 32a and fixed. And, rear end portions of arm pipes 35, 36 heading to the front are respectively inserted to the opposed connecting members 31a, 32a and fixed, connecting members 35a, 36a are respectively fit to front end portions of the opposed arm pipes 35, 36 and fixed, and a cross pipe 37 is inserted between the opposed connecting members 35a, 36a and fixed. Further, opposed end portions of a U-shaped front edge pipe 38 are respectively inserted to front portions of the opposed connecting members 35a, 36a and fixed.

In the column structure 30 having the above-described configuration, parts functioning as joints of the column structure 30, i.e., the connecting members 35a, 36a, the connecting members 31a, 32a as well as the attaching members 33a, 33b of the base member 33 respectively have pin holes 50a, 50b, 50c, 50d, 50e, 50f for pin connection.

With the configuration of the first embodiment, following advantages can be attained. Not only the ROPS canopy 50A can be used as the general ROPS canopy, but also the columns for reinforcing purposes may additionally be attached (added-on) to the pin holes 50a, 50b, 50c, 50d, 50e, 50f as required. Therefore, the ROPS canopy 50A can be applied to one model of a hydraulic excavator as a basic type, and also the columns for reinforcing purposes can additionally be attached to the ROPS canopy 50A to be applied to other higher class models (with heavy weight), so that the ROPS canopy 50A can commonly be used among various models regarding the different automobile ranks.

Figure 3:
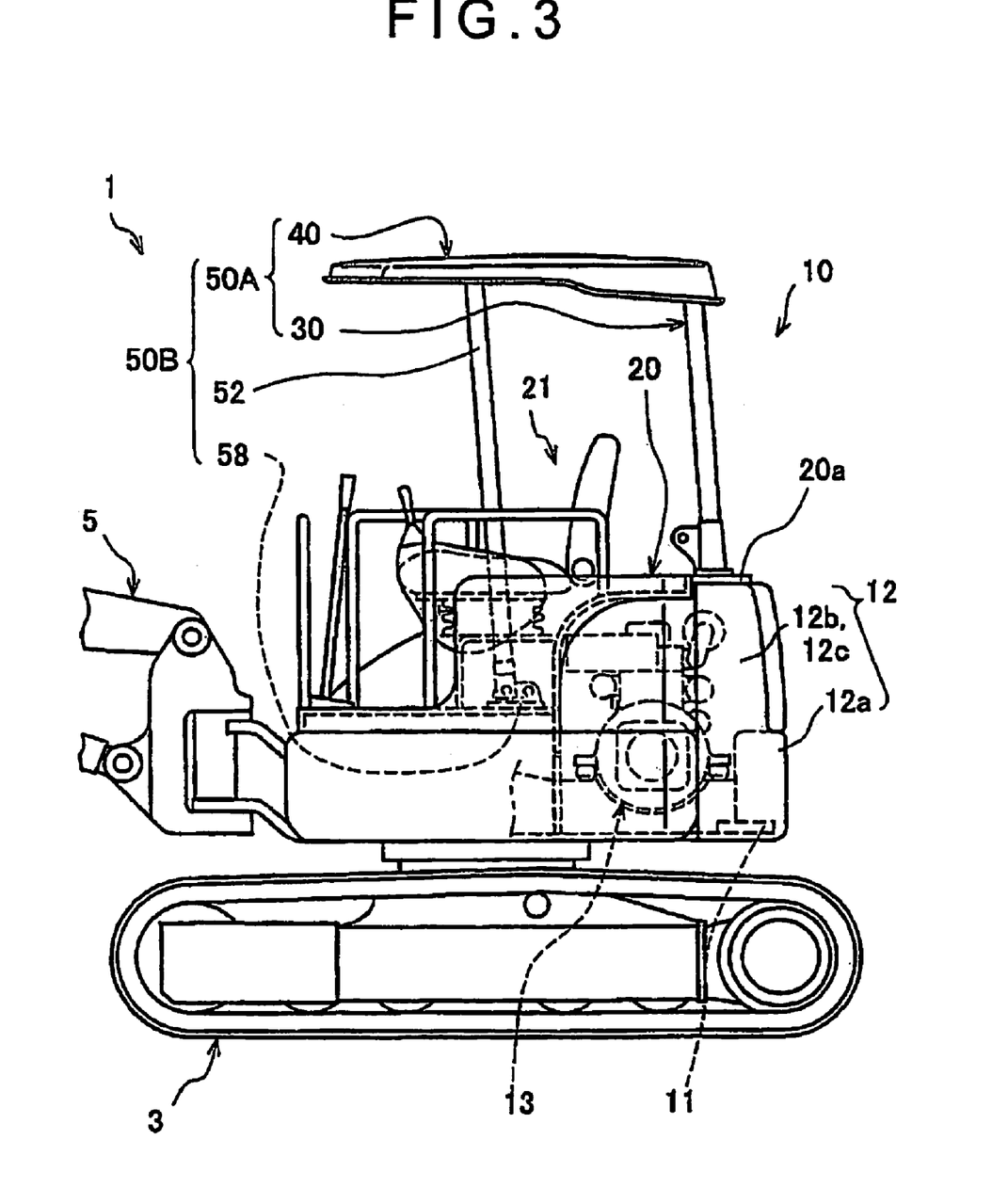
FIG. 3 is a side elevation showing a primary portion of a hydraulic excavator applying a ROPS canopy according to a second embodiment of the present invention.

Next, a second embodiment will be described with reference to FIGS. 3 and 4 as an example of applying the basic type ROPS canopy of the first embodiment to another higher class model. FIG. 3 is a side elevation showing a primary portion of a hydraulic excavator applying a ROPS canopy according to the second embodiment, and FIG. 4 is a perspective view showing the configuration of the ROPS canopy according to the second embodiment.

Figure 4:
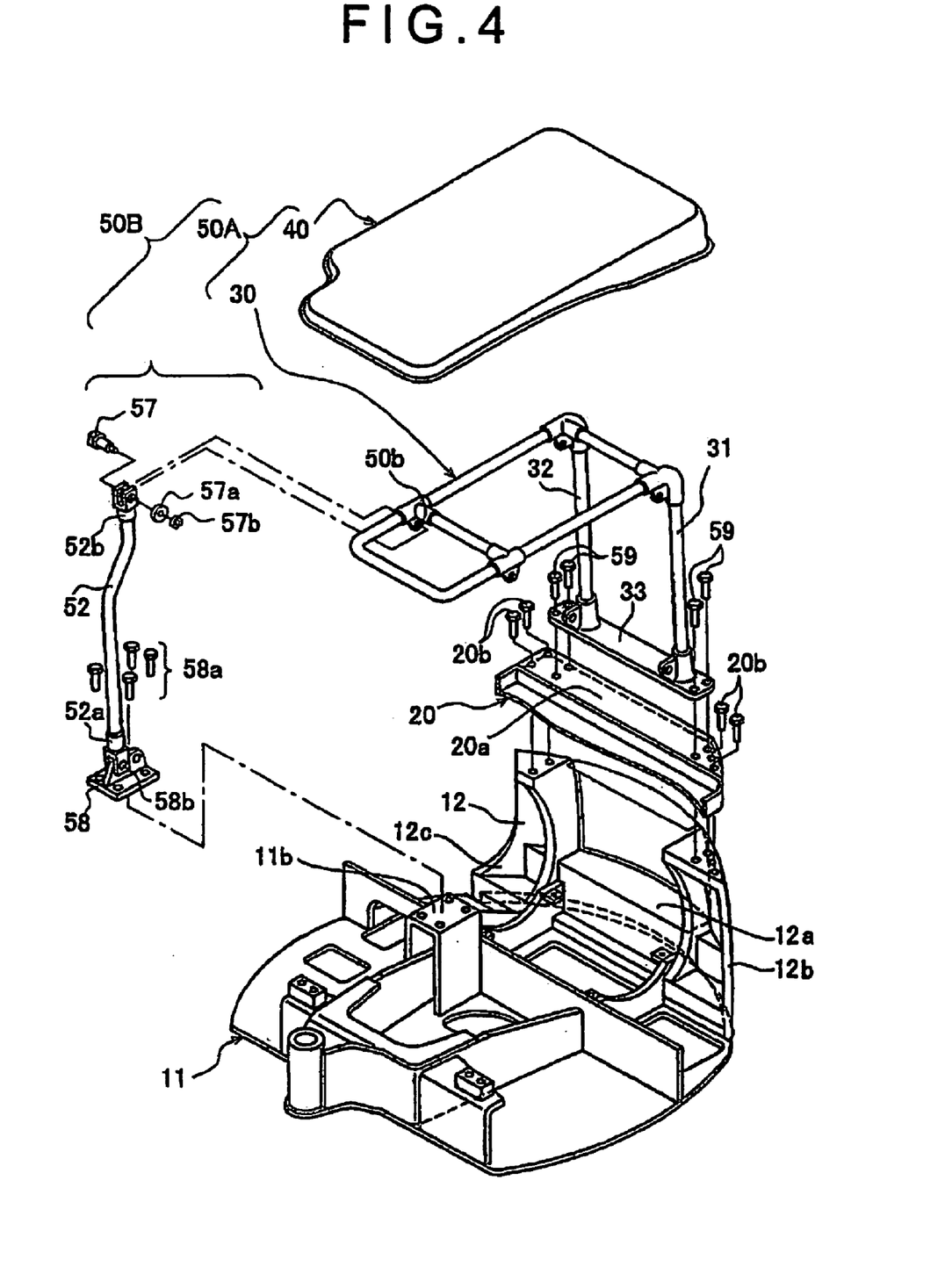
FIG. 4 is a perspective view showing the configuration of the ROPS canopy of the second embodiment.

In FIGS. 3 and 4, the hydraulic excavator 1 is so configured that the flange 20a located on the rear end portion of the floor frame 20 is fastened on the upper surfaces of the opposed supporting portions 12b, 12c of the counterweight 12 with a certain number of screw bolts 20b. On the upper surface of the flange 20a, the base member 33 of the ROPS canopy 50A described in the first embodiment is fastened with the certain number of the screw bolts 59. And, a column 52 is additionally attached to the left or right side (on the right side in this embodiment) of the front portion of the ROPS canopy 50A, thus configuring a ROPS canopy 50B.

Yokes 52a, 52b for pin connection are respectively fixed to lower and upper end portions of the column 52, the yoke 52a at the lower end portion being connected with a pin 58b to an upper surface of a bracket 58 attached on a bearing surface 11b of the revolving frame 11 with screw bolts 58a via the floor frame 20, and the yoke 52b at the upper end portion being fastened and connected to the pin hole 50b of the ROPS canopy 50A with a pin 57, a washer 57a and a nut 57b.

With the second embodiment, following advantages can be attained in addition to that of the first embodiment.

(1) While the basic type ROPS canopy 50A alone causes bending moment affecting on the opposed columns 31, 32 due to a load applied to the roof structure 40 since the roof structure 40 is projected to the front of the opposed columns 31, 32 like a cantilever, the ROPS canopy 50B according to the present embodiment remarkably reduces the bending moment by the column 52 being additionally added to the front portion of the ROPS canopy 50A. Accordingly, the ROPS canopy 50B of higher strength can be configured with the basic type ROPS canopy 50A being commonly used, enabling the basic type ROPS canopy 50A to be applied to higher class models.

(2) Since the additionally attached column 52 is connected with the pins 57, 58b, the strength of the ROPS canopy 50B can be assured as the one checked in a factory in advance even at an attachment site.

(3) Additionally, since the ROPS canopy 50A can be produced and stocked as the basic type ROPS canopy to be commonly used for various models, the production cost as well as the stock control cost can significantly be reduced.

Figure 5:
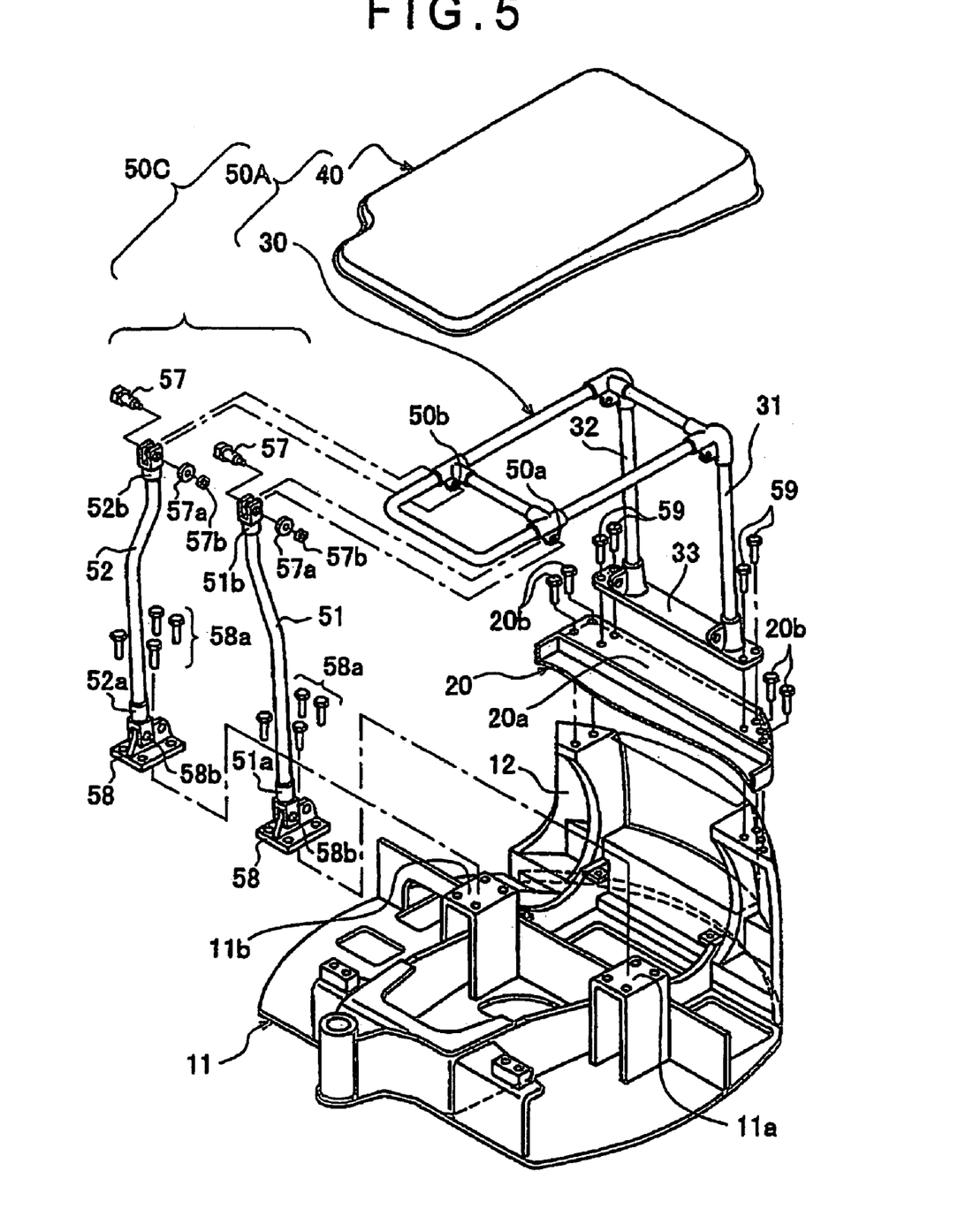
FIG. 5 is a perspective view showing the configuration of a ROPS canopy according to a third embodiment of the present invention.

Next, a third embodiment will be described with reference to FIG. 5 as an example of applying the basic type ROPS canopy of the first embodiment to still another higher class model. FIG. 5 is a perspective view showing the configuration of a ROPS canopy of the third embodiment.

In FIG. 5, a column 51 and the column 52 are additionally attached to the left and right portions of the front portion of the ROPS canopy 50A, thus configuring a ROPS canopy 50C.

The column 52 is configured as described in the second embodiment. The column 51 is so configured that yokes 51a, 51b for pin connection are respectively fixed to lower and upper end portions of the column 51, the yoke 51a at the lower end portion being connected with a pin 58b to a bracket 58 attached on a bearing surface 11a of the revolving frame 11 with screw bolts 58a via the floor frame 20, and the yoke 51b at the upper end portion being fastened and connected to the pin hole 50a of the ROPS canopy 50A with a pin 57, a washer 57a and a nut 57b.

With the configuration of the third embodiment, in addition to the advantages of the second embodiment, since the ROPS canopy 50C further decreases the bending moment affecting on the opposed columns 31, 32 due to the load applied to the roof structure 40, the ROPS canopy 50C of higher strength can be configured by commonly using the basic type ROPS canopy 50A, thus expanding the adaptable range of the basic type ROPS canopy 50A to the higher class models.

Figure 6:
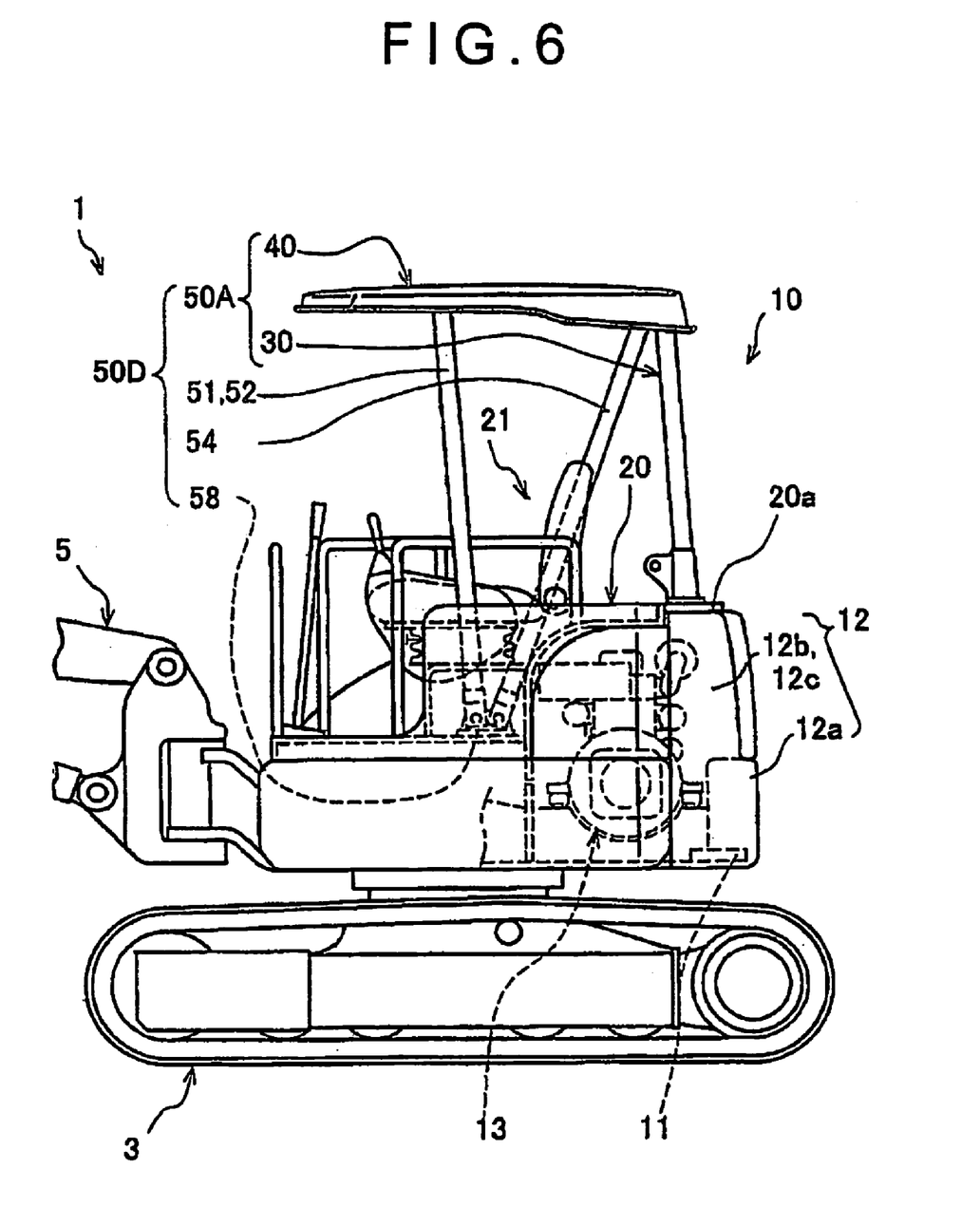
FIG. 6 is a side elevation showing a primary portion of a hydraulic excavator applying a ROPS canopy according to a fourth embodiment of the present invention.

Next, a fourth embodiment will be described with reference to FIGS. 6 and 7 as an example of applying the basic type ROPS canopy of the first embodiment to yet another higher class model. FIG. 6 is a side elevation showing a primary portion of a hydraulic excavator applying a ROPS canopy according to the fourth embodiment, and FIG. 7 is a perspective view showing the configuration of the ROPS canopy according to the fourth embodiment.

Figure 7:
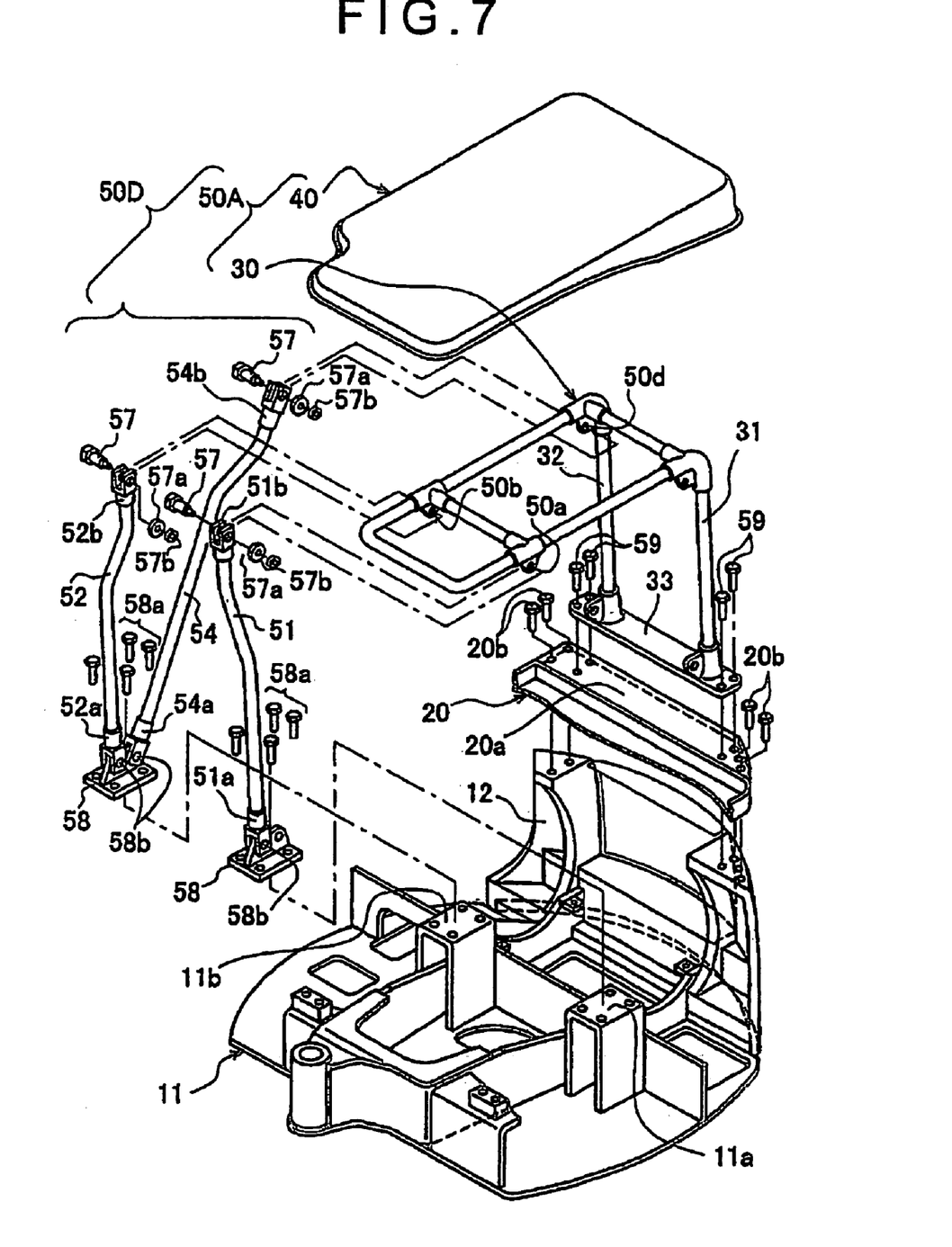
FIG. 7 is a perspective view showing the configuration of the ROPS canopy of the fourth embodiment.

In FIGS. 6 and 7, the columns 51, 52 are additionally attached to the left and right portions of the front portion of the basic type ROPS canopy 50A, and a diagonal column 54 is additionally attached to the left or right side (on the right side in this embodiment) of the ROPS canopy 50A, thus configuring a ROPS canopy 50D.

The columns 51, 52 are configured as described in the second embodiment. The diagonal column 54 is so configured that yokes 54a, 54b for pin connection are respectively fixed to lower and upper end portions of the diagonal column 54, the yoke 54a at the lower end portion being connected with a pin 58b to the bracket 58 attached on the bearing surface 11b of the revolving frame 11 with the screw bolts 58a via the floor frame 20, and the yoke 54b at the upper end portion being fastened and connected to the pin hole 50d of the ROPS canopy 50A with a pin 57, a washer 57a and a nut 57b.

With the configuration of the fourth embodiment, in addition to the advantages of the third embodiment, since the ROPS canopy 50D is so configured that the diagonal column 45 is attached between the pin hole of the bracket 58 and the pin hole 50d of the ROPS canopy 50A with the both pin holes being in diagonal relationship, the bending moment affecting on the opposed columns 31, 32 due to the load applied to the roof structure 40 can further be reduced. Thus, the ROPS canopy 50D according to the present embodiment can further expand the adaptable range to the higher class models.

Figure 8:
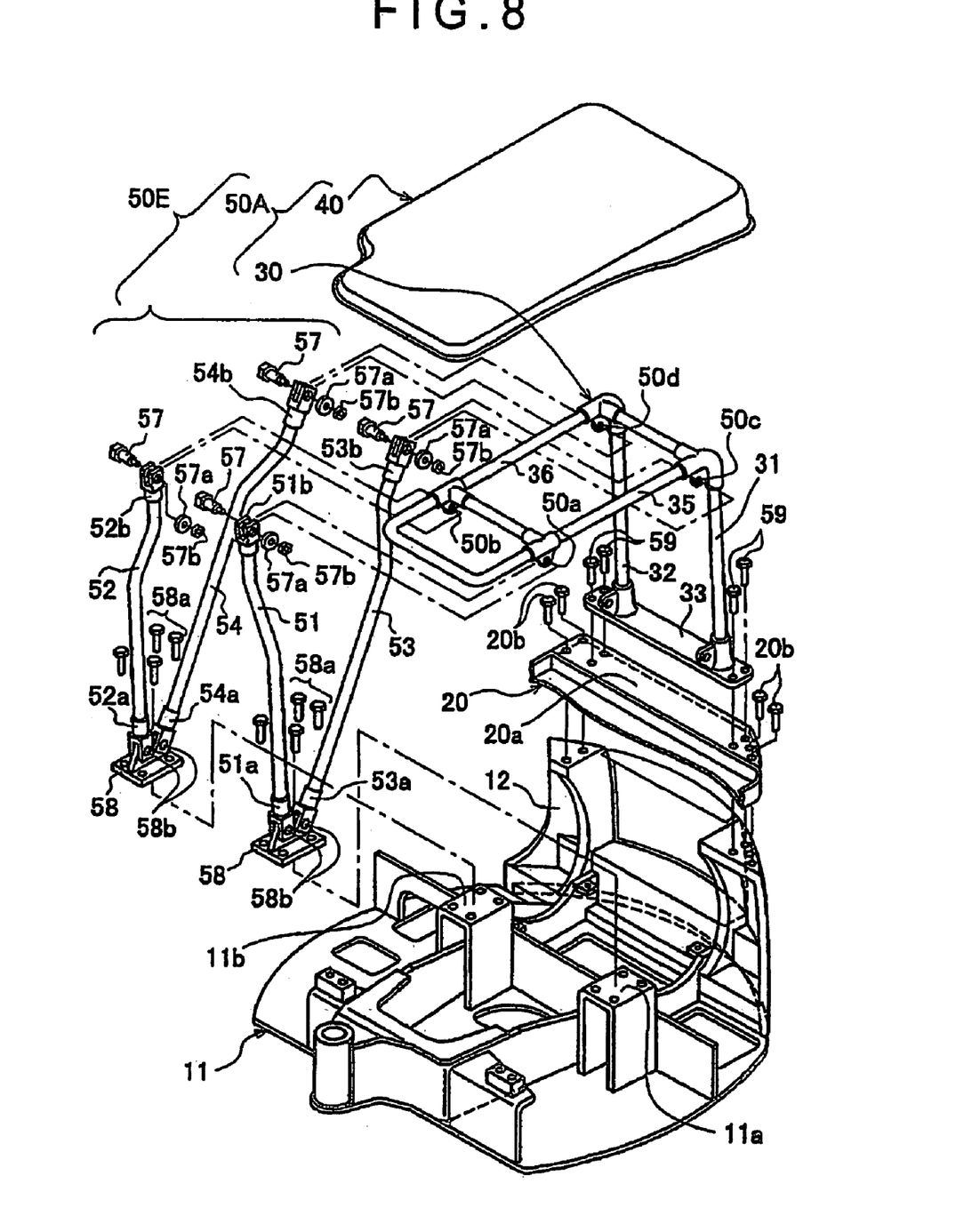
FIG. 8 is a perspective view showing the configuration of a ROPS canopy according to a fifth embodiment of the present invention.

Next, a fifth embodiment will be described with reference to FIG. 8 as an example of applying the basic type ROPS canopy of the first embodiment to further higher class model. FIG. 8 is a perspective view showing the configuration of a ROPS canopy of the fifth embodiment.

In FIG. 8, the columns 51, 52 are additionally attached to the left and right portions of the front portion of the basic type ROPS canopy 50A, and a diagonal column 53 and the diagonal column 54 are additionally attached to the left and right sides of the ROPS canopy 50A, thus configuring a ROPS canopy 50E.

The columns 51, 52 as well as the diagonal column 54 are configured as described in the fourth embodiment. The diagonal column 53 is so configured that yokes 53a, 53b for pin connection are respectively fixed to lower and upper end portions of the diagonal column 53, the yoke 53a at the lower end portion being connected with a pin 58b to a bracket 58 attached on the bearing surface 11a of the revolving frame 11 with the screw bolts 58a via the floor frame 20, and the yoke 53b at the upper end portion being fastened and connected to the pin hole 50c of the ROPS canopy 50A with a pin 57, a washer 57a and a nut 57b.

With the fifth embodiment, following advantages can be attained in addition to that of the fourth embodiment.

When the ROPS canopy 50E is viewed in lateral direction, a triangle is defined by the columns 31, 32, the arm pipes 35, 36, the additional columns 51, 52, the diagonal columns 53, 54, and a vehicle body. Owing to this, when the load is applied to the roof structure 40, only compressive or tensile axial force is applied to the above-described respective components, but no bending moment affects thereon. Therefore, the ROPS canopy 50E according to the present embodiment can be applied to the hydraulic excavators of the higher class models with heavy vehicle weight.

Figure 9:
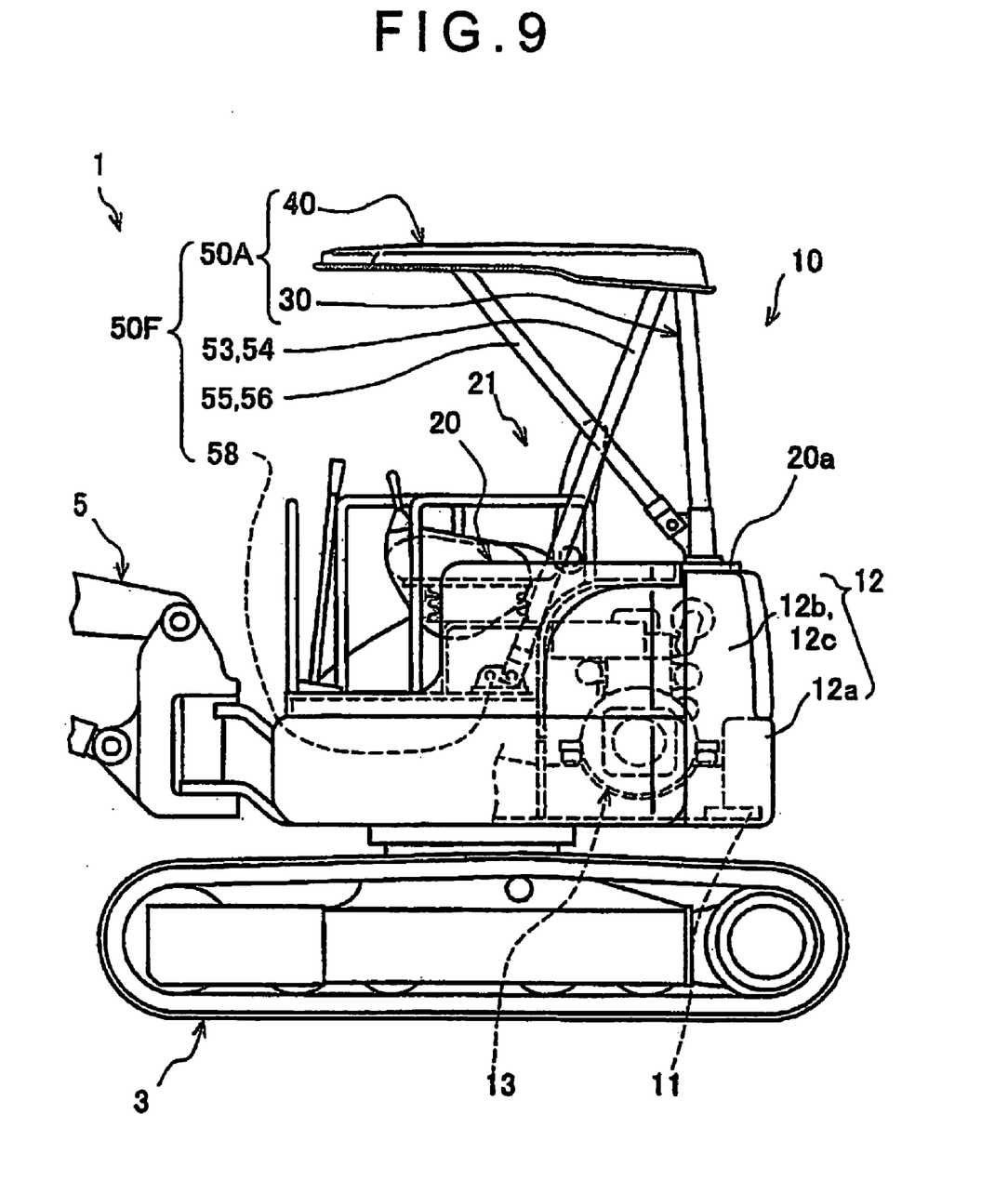
FIG. 9 is a side elevation showing a primary portion of a hydraulic excavator applying a ROPS canopy according to a sixth embodiment of the present invention.

Next, a sixth embodiment will be described with reference to FIGS. 9 and 10 as an example of applying the basic type ROPS canopy of the first embodiment to still further higher class model. FIG. 9 is a side elevation showing a primary portion of a hydraulic excavator applying a ROPS canopy according to the sixth embodiment, and FIG. 10 is a perspective view showing the configuration of the ROPS canopy according to the sixth embodiment.

Figure 10:
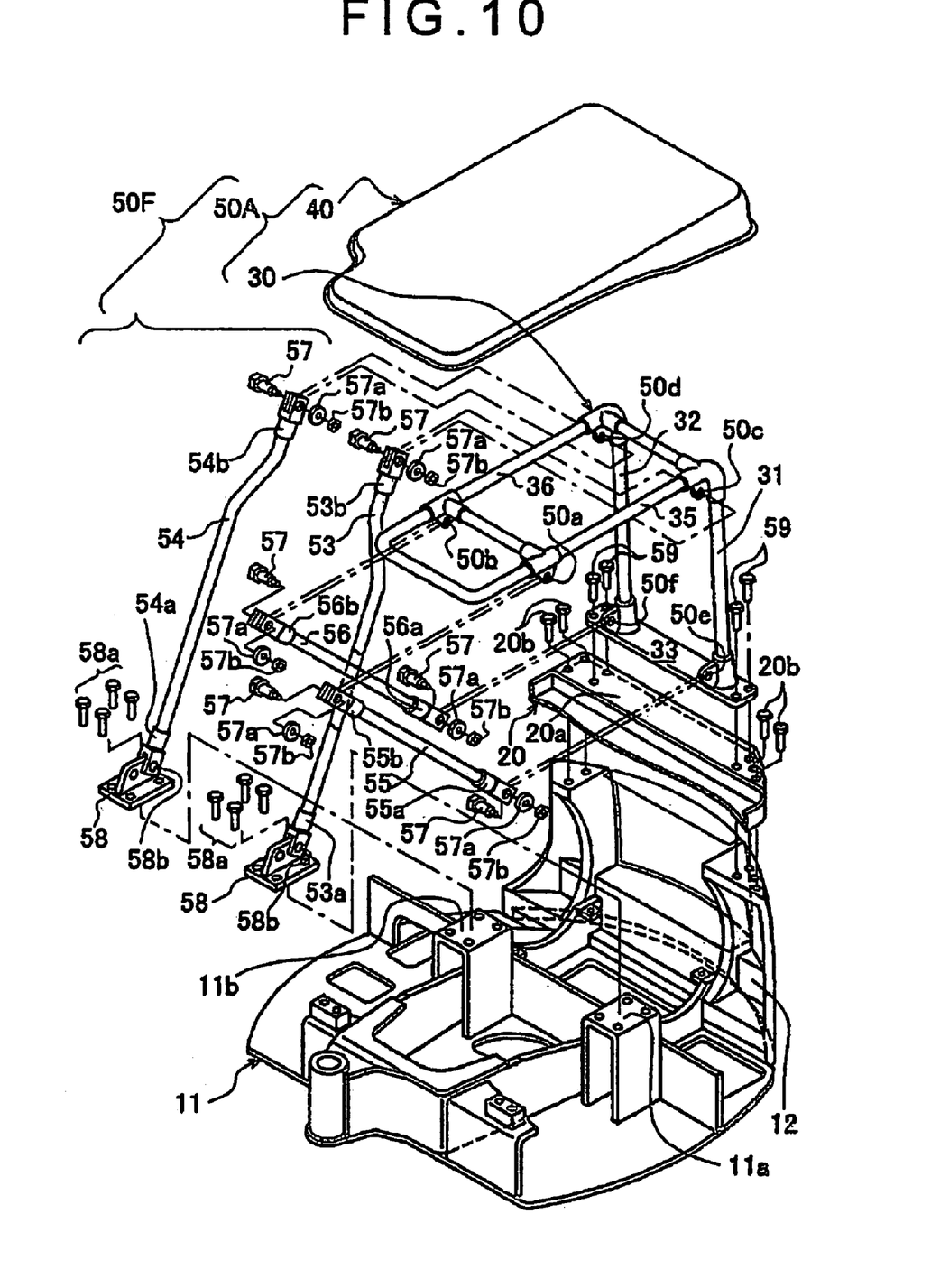
FIG. 10 is a perspective view showing the configuration of the ROPS canopy of the sixth embodiment.

In FIGS. 9 and 10, the diagonal columns 53, 54 and diagonal columns 55, 56 are additionally attached on the left and right sides of the basic type ROPS canopy 50A, thus configuring a ROPS canopy 50F.

The diagonal columns 53, 54 are configured as described in the fifth embodiment. The diagonal columns 55, 56 are so configured that yokes 55a, 56a as well as yokes 55b, 56b for pin connection are respectively fixed to lower and upper end portions of the diagonal columns 55, 56, the yokes 55a, 56a at the lower end portions respectively being connected to the pin holes 50e, 50f of the attaching members 33a, 33b of the base member 33 of the ROPS canopy 50A, and the yokes 55b, 56b at the upper end portions respectively being fastened and connected to the pin holes 50a, 50b of the ROPS canopy 50A, with pins 57, washers 57a and nuts 57b.

With the sixth embodiment, following advantages can be attained in addition to that of the fifth embodiment.

(1) When the ROPS canopy 50F is viewed in lateral direction, a triangle is defined by the columns 31, 32, the arm pipes 35, 36, the diagonal columns 53, 54, the diagonal columns 55, 56, and the vehicle body. Owing to this, when the load is applied to the roof structure 40, only the compressive or tensile axial force is applied to the above-described respective components, but no bending moment affects thereon. Therefore, the ROPS canopy 50F according to the present embodiment can be applied to the hydraulic excavators of the higher class models with the heavy vehicle weight.

(2) Since the columns to be additionally attached are merely the diagonal columns 53 54, 55, 56, the sight from the operator's cab 21 is hardly affected as expected by FIG. 9.

(3) The ROPS canopy 50F can be attached to/detached from the vehicle body only with the screw bolts 59 for fastening the base member 33 and the pins 58b, 58b for attaching the columns 53, 54, thus easily attaching/detaching the ROPS canopy 50F according to the present embodiment.

In the configurations described in the first to sixth embodiments, the ROPS canopy 50A is commonly used among the various models as predefining the ROPS canopy 50A as the basic type ROPS canopy, thus configuring the ROPS canopies 50A, 50B, 50C, 50D, 50E, 50F respectively having various strength. Therefore, these canopies can be applied to the various models of the hydraulic excavators with different vehicle weight.

Incidentally, in the configurations of the first to sixth embodiments, although the additional columns 51, 52, 53, 54, 55, 56 are attached in the exemplary manners upon the ROPS canopies 50B, 50C, 50D, 50E, 50F, it is not limited thereto, and the additional columns may be attached on the respective left and right sides of the ROPS canopy 50A in an arbitrary manner.

Additionally, although the additional columns 51, 52, 53, 54, 55, 56 are attached to the ROPS canopy 50A with the pins 57, the pins 57 may not be used. For example, the columns may be attached with screw bolts to attachment surfaces having screw holes (all not shown), or with U-shaped screw bolts (not shown).

Further, although the ROPS canopy 50A is described to be supported by the opposed supporting portions 12b, 12c of the counterweight 12, it is not limited thereto. The ROPS canopy 50A may be supported by a frame (not shown) vertically arranged on the revolving frame 11.

Consequently, the ROPS canopy of the hydraulic excavator commonly usable among the various models of the hydraulic excavators regarding the different automobile ranks can be provided.

INDUSTRIAL APPLICABILITY

The present invention is useful as the ROPS canopy of the hydraulic excavator commonly usable among the various models of the hydraulic excavators regarding the different automobile ranks.

The invention claimed is:

1. A ROPS canopy for a vehicle, comprising:
   a roof structure; and
   a supporting column structure which supports the roof structure with respect to a body of the vehicle, and which includes: (i) a support structure that is mounted to the roof structure and extends along a front-to-rear direction of the vehicle, (ii) at least two supporting columns provided at a rear side of the vehicle and which support the support structure with respect to the body of the vehicle, and (iii) a plurality of connection members;
   wherein one of the connection members is provided at each of: a top of each of the supporting columns, a base of each of the supporting columns, and two forward positions of the supporting column structure; and
   wherein at least one additional supporting column to provide further support to the roof structure is selectively attachable to the supporting column structure by attachment to at least one of the connection members.

2. The ROPS canopy according to claim 1, wherein the at least one additional supporting column comprises at least one forward additional supporting column, which is coupled to one of the connection members provided at one of the forward positions of the supporting column structure; and
   wherein the forward additional supporting column comprises a base that is mounted to the body of the vehicle, and wherein one of the plurality of connection members is provided at the base of the forward additional supporting column, and at least one further additional supporting column is selectively attachable to the connection member at the base of the forward additional supporting column.

3. A ROPS canopy for a vehicle, comprising:
   a roof structure; and
   a supporting column structure which supports the roof structure with respect to a body of the vehicle;
   wherein the supporting column structure comprises:
       a support structure that is mounted to the roof structure and extends along a front-to-rear direction of the vehicle;
       two supporting columns which are provided at a rear side of the vehicle and which support the support structure with respect to the body of the vehicle;

a plurality of connection members, including first connection members provided at a forward position of the support structure, second connection members respectively provided at upper positions of the two supporting columns, and third connection members respectively provided at lower positions of the two supporting columns;

wherein at least one additional supporting column is selectively attachable to the supporting column structure by attachment to at least one of the connection members;

wherein the at least one additional supporting column is selectively attachable at least: (i) between a position on the body of the vehicle and one of the first connection members, (ii) between a position on the body of the vehicle and one of the second connection members, and (iii) between one of the first connection members and one of the third connection members.

4. The ROPS canopy according to claim 3, wherein the at least one additional supporting column comprises at least one forward additional supporting column, which is coupled to one of the connection members provided at one of the forward positions of the supporting column structure; and wherein the forward additional supporting column comprises a base that is mounted to the body of the vehicle, and wherein a fourth connection member is provided at the base of the forward additional supporting column, and wherein at least one further additional supporting column is selectively attachable between the fourth connection member and one of the second connection members.

* * * * *